(12) United States Patent
Pruthi

(10) Patent No.: US 8,473,680 B1
(45) Date of Patent: Jun. 25, 2013

(54) HOTSPOT DETECTION AND CACHING FOR STORAGE DEVICES

(75) Inventor: Arvind Pruthi, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 350 days.

(21) Appl. No.: 12/881,459

(22) Filed: Sep. 14, 2010

Related U.S. Application Data

(60) Provisional application No. 61/243,990, filed on Sep. 18, 2009.

(51) Int. Cl.
G06F 12/00 (2006.01)
G06F 13/00 (2006.01)
G06F 13/28 (2006.01)

(52) U.S. Cl.
USPC .......................................................... 711/118

(58) Field of Classification Search
USPC .......................................................... 711/118
See application file for complete search history.

(56) References Cited

U.S. PATENT DOCUMENTS

| | | | |
|---|---|---|---|
| 6,425,057 B1 * | 7/2002 | Cherkasova et al. | 711/134 |
| 2004/0139282 A1 * | 7/2004 | Yoshioka et al. | 711/133 |
| 2005/0050279 A1 * | 3/2005 | Chiu et al. | 711/137 |
| 2006/0053416 A1 * | 3/2006 | Watanabe | 717/151 |
| 2007/0239806 A1 * | 10/2007 | Glover | 707/204 |
| 2009/0182947 A1 * | 7/2009 | van Riel | 711/129 |

* cited by examiner

Primary Examiner — Sheng-Jen Tsai

(57) ABSTRACT

A system includes a counting module, a region defining module, and a caching module. The counting module is configured to count a first number of accesses to a first region of a storage medium during a first time period. The counting module is configured to count a second number of accesses to the first region during a second time period following the first time period. The region defining module is configured to selectively define a second region and a third region within the first region when the second number of accesses is greater than the first number of accesses by a predetermined amount. The caching module is configured to selectively cache the second region into a cache memory when a third number of accesses to the second region during a third time period following the second time period is greater than a fourth number of accesses to the third region during the third time period.

20 Claims, 4 Drawing Sheets

Region R (Storage Device)

Region R1 | Region R2

Region R3 | Region R4 | Region R2

Region R3 | Region R5

| Temp. Grade | Range: No. of accesses per interval (Data transferred per interval) |
|---|---|
| Coldest | 0-20 (Up to 80KB) |
| Very Cold | 21-40 (84-160KB) |
| Cold | 41-80 (164-320KB) |
| Cool | 81-160 (324-640KB) |
| Moderate | 161-320 (644KB-1.25MB) |
| Warm | 321-640 (1284KB-2.5MB) |
| Hot | 641-1280 (2564KB-5MB) |
| Very Hot | 1281-2560 (5124KB-10MB) |
| Hottest | >2560 (>10MB) |

FIG. 1

HOTSPOT DETECTION AND CACHING FOR STORAGE DEVICES

CROSS-REFERENCE TO RELATED APPLICATIONS

This application claims the benefit of U.S. Provisional Application No. 61/243,990, filed on Sep. 18, 2009. The disclosure of the above application is incorporated herein by reference in its entirety.

FIELD

The present disclosure relates generally to data storage devices and more particularly to hotspot detection and caching for storage devices.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Examples of storage devices include hard disk drives and optical disc drives. Storage devices typically store data in blocks on a rotating storage medium. Block sizes are generally measured in kilobytes (KB). For example, the storage medium may include magnetic disks, optical discs, etc. Therefore, the storage devices typically have slower access times than semiconductor memory. As a result, data can be read faster from a semiconductor memory than from the storage medium.

Most storage devices include a semiconductor memory called cache memory to store data that is repeatedly requested by a host or data that may be requested by the host. Additionally, the storage devices include a cache controller that controls caching of data to the cache memory.

For example, when the host issues a read command, the cache controller first determines if the requested data is available in the cache memory. If not, a cache miss occurs, and the data is retrieved from the storage medium and is forwarded to the host. The cache controller may cache the data into the cache memory.

When the host requests the same data again, the data is found in the cache memory (i.e., a cache hit occurs) and is output to the host from the cache memory. The host receives the data faster from the cache memory than from the storage medium. Additionally, based on the data requested by the host, other related data may be cached in anticipation that the host may request the other related data.

The size of the cache memory, however, is generally limited. Accordingly, the amount of data that can be cached is also generally limited. Therefore, the cache controller may selectively delete data from the cache memory. For example, data not requested by the host for a period of time may be deleted from the cache memory. Data may also be deleted when the host requests different data than the data stored in the cache memory. By selectively deleting data from the cache memory, data that is more likely to be used by the host can be cached.

SUMMARY

A system includes a counting module, a region defining module, and a caching module. The counting module is configured to count a first number of accesses to a first region of a storage medium during a first time period. The counting module is configured to count a second number of accesses to the first region during a second time period following the first time period. The region defining module is configured to selectively define a second region and a third region within the first region when the second number of accesses is greater than the first number of accesses by a predetermined amount. The caching module is configured to selectively cache the second region into a cache memory when a third number of accesses to the second region during a third time period following the second time period is greater than a fourth number of accesses to the third region during the third time period.

In another feature, the system further includes a merging module configured to merge the second region into a fourth region of the storage medium, wherein the fourth region is adjacent to the second region.

In another feature, the merging module is configured to merge the second region into the fourth region when (i) the third number of accesses to the second region during the third time period is less than the fourth number of accesses to the third region during the third time period, and (ii) a rate of access to the second region and the fourth region is within a predetermined range.

In another feature, the region defining module is further configured to selectively define the second region and the third region within the first region when a size of the first region is greater than a predetermined size.

In another feature, the region defining module is further configured to selectively define the second region and the third region within the first region when a total number of regions concurrently monitored by the counting module is less than or equal to a predetermined number of regions.

In another feature, the caching module is further configured to cache the second region into the cache memory when a size of the second region is less than or equal to a predetermined size.

In other features, a controller includes the system, the cache memory, and a read/write module configured to read/write data from/to the storage medium and to read data corresponding to the second region from the cache memory when the data is read after the second region is cached into the cache memory.

In still other features, a method includes counting a first number of accesses to a first region of a storage medium during a first time period. The method further includes counting a second number of accesses to the first region during a second time period following the first time period. The method further includes selectively defining a second region and a third region within the first region when the second number of accesses is greater than the first number of accesses by a predetermined amount. The method further includes selectively caching the second region into a cache memory when a third number of accesses to the second region during a third time period following the second time period is greater than a fourth number of accesses to the third region during the third time period.

In another feature, the method further includes merging the second region into a fourth region of the storage medium, wherein the fourth region is adjacent to the second region.

In another feature, the method further includes merging the second region into a fourth region of the storage medium when (i) the third number of accesses to the second region during the third time period is less than the fourth number of accesses to the third region during the third time period, and (ii) a rate of access to the second region and the fourth region is within a predetermined range.

In another feature, the method further includes selectively defining the second region and the third region within the first region when a size of the first region is greater than a predetermined size.

In another feature, the method further includes selectively defining the second region and the third region within the first region when a total number of regions concurrently monitored by the counting module is less than or equal to a predetermined number of regions.

In another feature, the method further includes caching the second region into the cache memory when a size of the second region is less than or equal to a predetermined size.

In another feature, the method further includes reading data corresponding to the second region from the cache memory when the data is read after the second region is cached into the cache memory.

In still other features, the system and method described above are implemented by a computer program executed by one or more processors. The computer program can reside on a tangible computer readable medium such as, but not limited to, memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 1 is a table showing an example of a temperature grade for determining temperature of a region of a storage device;

DESCRIPTION

Figure 2:
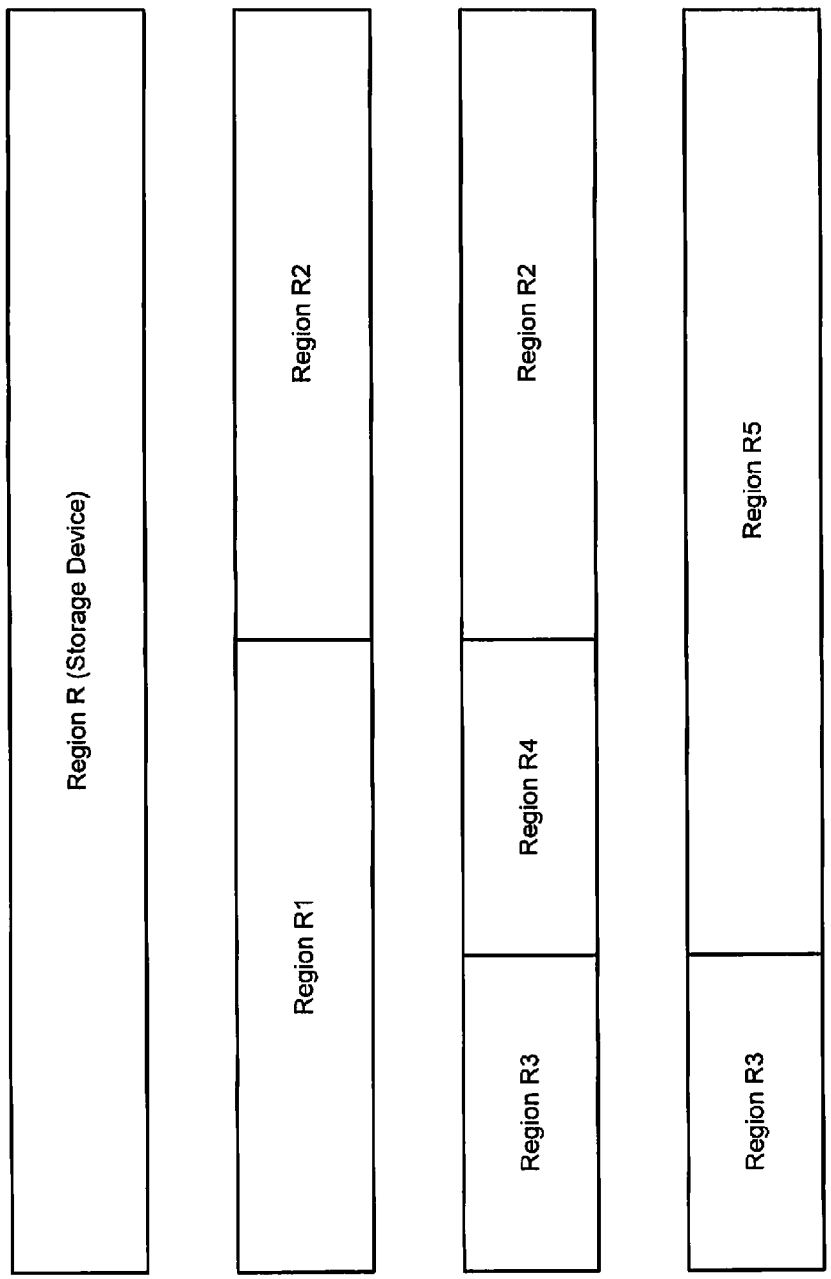
FIG. 2 depicts splitting and merging of regions of a storage device.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Most caching systems cache a block of data when the block accessed is not found in cache memory. The host, however, may not use the cached block again. Instead, the host may request other data that may be used repeatedly by the host. Caching blocks when the blocks are not found in the cache memory can result in populating the cache memory with blocks that might not be used again by the host. Populating the cache memory in this manner reduces the amount of cache memory available to cache other data that may be used repeatedly by the host. Thus, caching blocks when the blocks are not found in the cache memory can result in wasted cache memory.

The present disclosure relates to identifying specific regions of a storage device that are accessed at a higher rate than other regions of the storage device and caching data from the specific regions. Caching data in this manner can increase a cache hit ratio and cache utilization. The algorithms described in the present disclosure are for illustrative purposes only. Alternatively or additionally, other algorithms may be used to identify the specific regions and to cache data from the specific regions.

The following terms and definitions are used in the present disclosure. A hotspot on a storage device is defined as an area that is accessed at a higher rate than other regions over a particular time period. An access to a region of a storage device includes a read operation or a write operation performed on the region. A region of a storage device is a contiguous portion or subsection of the storage device that is separately monitored for determining existence of a hotspot. The notation R is used to refer to a region.

A size of a region is measured in terms of number of blocks in the region. For example only, the size of a region can be measured in terms of number of 4KB blocks in the region. The notation $N_R$ is used to refer to the size of a region R.

A temperature of a region is a measure of hotness/coldness of the region. The temperature of a region is measured in terms of a number of accesses to the region during a time period. Accordingly, a first region is hotter than a second region when the number of recent accesses to the first region during a time period is greater than the number of accesses to the second region during the time period.

The temperature of a region can be measured as a mean-averaged value of the number of blocks (e.g., no. of 4KB blocks) accessed in one measurement interval. A measurement interval is a predetermined time period for which a sample is taken for temperature measurement. The notation $\Delta\lambda$ is used to refer to the measurement interval. A temperature sample represents the latest sample of temperature (i.e., number of block accesses) for a region R during a last measurement interval.

A temperature grade provides a scale that divides the temperature of a region into multiple ranges. A range is defined in terms of mean-averaged number of accesses per measurement interval. For example, in FIG. 1, a table shows a temperature grade divided into nine ranges. The ranges may be contiguous as shown or non-contiguous. The data amounts shown in parentheses are based on a block size of 4KB and denote the amount data read or written from/to a region per measurement interval. The ranges shown follow an exponential scale for example only.

The number of ranges and the size of each range can be defined in other ways. For example, the number of ranges can be greater that nine or less than nine. The size of each range (e.g., (Y-X) is the size of a range from X to Y number of accesses per measurement interval) can be fixed or variable.

Hotspots result from intense activity on regions of a storage device, where the storage device typically stores data in blocks on a rotating storage medium. Hotspots are generally concentrated in one or more regions of the storage device. The hotter a region, the greater the likelihood that the region will be accessed again. Therefore, cache population systems may aggressively pre-fetch data from hotspots instead of caching data from cold regions of the storage device. Hotspots may be monitored more microscopically than colder regions of the storage device. For example, as shown in FIG. 1, hotspots can be monitored in smaller regions (i.e., more microscopically) than colder regions.

A hot region may be composed of one or more hotspots while most of the region may be cold. Aggressive caching is only useful for a portion of the region that is truly hot. As a region heats up, the region can be split into two regions for closer monitoring. Conversely, as a region cools down, the region can be merged (i.e., combined) with other adjacent regions that are equally cold. Thus, a hotspot can be isolated, and thereafter data in the hotspot (and surrounding region) can be cached to provide efficient caching.

Referring now to FIG. 2, after booting, the entire storage device may be initially regarded as one region R. As the read/write operations are performed on the storage device, the temperature of the region R is measured and updated after each measurement interval. When the temperature of the region R increases by one grade, the region R is split into two regions R1 and R2, and each region (R1 and R2) is monitored separately. That is, when the number of accesses to the region R per measurement period increases by a predetermined amount, the region R is split into two regions R1 and R2, and each region (R1 and R2) is monitored separately.

After the next measurement interval, the temperature of each region (R1 and R2) is updated and sampled again. The temperature of the region (e.g., R1) having more accesses will increase while the temperature of the region (e.g., R2) having fewer accesses will decrease. Accordingly, the region having a higher temperature (e.g., R1) is monitored further with higher granularity, and the region having a lower temperature (e.g., R2) is monitored with lower granularity. In some implementations, the region having the lower temperature (e.g., R2) may be monitored less frequently than the region having the higher temperature (e.g., R1).

During the next measurement interval, the temperature of the monitored region (e.g., R1) is updated. When the temperature of the monitored region (e.g., R1) increases by one grade, the monitored region (e.g., R1) is split into two regions again (e.g., R3 and R4), and so on. The process is repeated until a region having a size equal to a predetermined minimum size (i.e., a smallest size) is found. The region identified in this manner is a hotspot. Data in the hotspot is cached. Additionally, data in an area surrounding the hotspot may also be cached.

Thus, after a measurement interval, if the temperature of a region being monitored increases by one grade, the region is split into two regions. In some implementations, a region may be split if the temperature of the region remains above a predetermined grade (e.g., above moderate) for two or more successive measurement intervals.

Conversely, if the temperature of a monitored region decreases by one grade, the region is merged with an adjacent region or regions having the same temperature as the region being monitored. For example, the region R4 may be the region that is being monitored. If the temperature of the region R4 decreases by one grade, the region R4 is merged with the region R2 if the temperature of the region R2 is the same as the temperature of the region R2.

The total number of concurrently monitored regions may be limited to less than or equal to a predetermined maximum number. Limiting the total number of monitored regions can minimize overhead and maximize benefits of monitoring hotspots.

During a measurement interval, for every access to the storage device, a current sample "t" of the temperature of a region is updated. At the end of the measurement interval, the temperature of the region is updated with the number of accesses to the region using the following formula:

$$T_{R(n)} \leftarrow \beta \times t_R + (1-\beta) \times T_{R(n-1)}$$

where $T_{R(n)}$ is a weighted mean-averaged temperature of a region R at time n. $T_{R(n-1)}$ is a weighted mean-averaged temperature of a region R at time (n−1). n is a variable that represents the number of intervals (n) that have elapsed in increments of the measurement interval $\Delta\lambda$ since the last system reboot. $\beta$ is a predetermined constant. $t_R$ is a last temperature sample for a region R.

$\beta$ is used to assign a weight to the last temperature sample and to calculate weighted mean-averaged temperature of a region. The smaller the value of $\beta$, the higher the weight assigned to the temperature history while calculating the updated temperature of a region. At the end of the measurement interval, the updated temperature sample is used to determine if the temperature of the region changed by a grade (i.e., by a predetermined amount) and if the region can be split or merged.

When a region is split into regions R1 and R2, temperatures of the split regions R1 and R2 may be determined using the following formulas:

$$T_{R1(n)} = T_{R(n)}, N_{R1} = N_R \div 2,$$

and $$T_{R2(n)} = T_{R(n)}, N_{R2} = N_R \div 2$$

where $N_{R1}$ is the size of the first split region R1. $N_{R2}$ is the size of the second split region R2. $N_R$ is the size of the original region R. $T_{R1(n)}$ is the temperature of the first split region R1. $T_{R2(n)}$ is the temperature of the second split region R2. $T_{R(n)}$ is the temperature of the original region R.

When two regions R1 and R2 are merged into a region MR, the temperature of the merged region MR may be determined using the following formula.

$$T_{MR(n)} = (T_{R1(n)} \times N_{R1} + T_{R2(n)} \times N_{R2}) \div (N_{R1} + N_{R2})$$

The formulae in the present disclosure are used as examples only. Other formulae or algorithms may be used instead.

Figure 3:
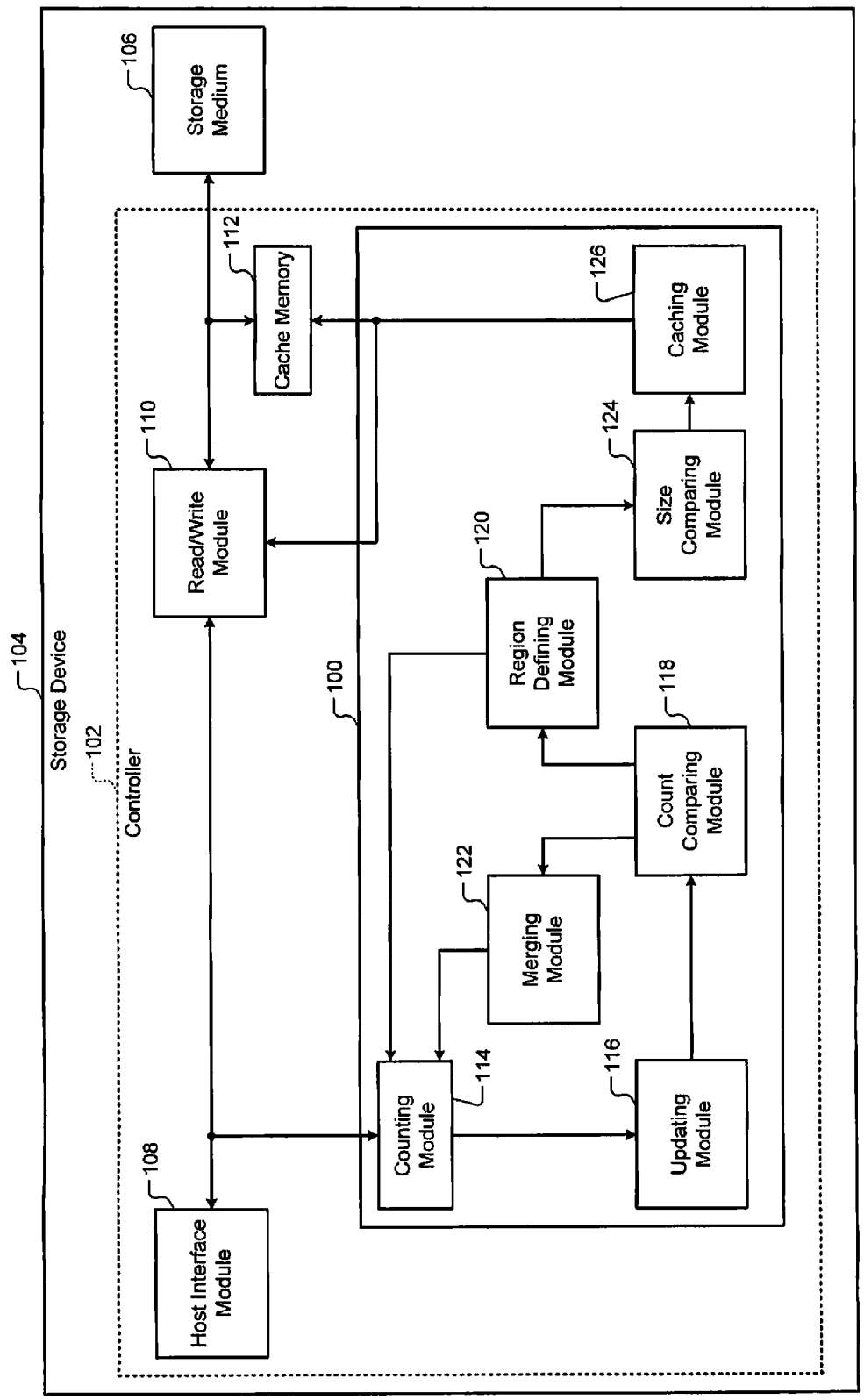
FIG. 3 is a functional block diagram of a system for identifying a hotspot of a storage device and caching data from the hotspot into a cache memory.

Referring now to FIG. 3, a system 100 for identifying a hotspot and caching data from the hotspot according to the present disclosure is shown. The system 100 can be implemented, for example, in a controller 102 of a storage device 104. For example, the storage device 104 can include a hard disk drive (HDD), an optical disc drive, or any other storage device used to store data. Additionally, the controller 102 can include, for example, a hard disk controller (HDC) of a HDD or a controller of an optical disc drive.

The controller 102 is used as an example to illustrate one way in which the system 100 can be implemented. Alternatively, the system 100 can be implemented external to the controller 102 or as part of a host driver for the storage device 104.

The storage device 104 includes the controller 102 and a storage medium 106. For example, the storage medium 106 may include a magnetic medium of a HDD, an optical disc of an optical disc drive, or a storage medium of any other storage device. The storage medium 106 may include a logical unit device exported by a storage server. The storage medium 106 stores data. The controller 102 includes the system 100, a host interface module 108, a read/write module 110, and a cache memory 112.

The host interface module 108 interfaces the storage medium 106 to a host (not shown). The host accesses the storage medium 106 via the host interface module 108. The host interface module 108 outputs read/write commands received from the host to the read/write module 110.

The read/write module 110 receives data to be written from the host via the host interface module 108 and writes the data to the storage medium 106 according to the write commands. Additionally, the read/write module 110 reads data from the storage medium 106 according to the read commands and returns the data to the host via the host interface module 108. The system 100 caches data into the cache memory 112 as follows.

The system 100 includes a counting module 114, an updating module 116, a count comparing module 118, a region defining module (i.e., a splitting module) 120, a merging module 122, a size comparing module 124, and a caching module 126.

The counting module 114 counts a number of accesses per measurement period to regions of the storage medium 106. The counting module 114 limits the total number of regions concurrently monitored to less than or equal to a predetermined number of regions (i.e., maximum number of regions). That is, the counting module 114 limits the total number of regions, for which the number of accesses per measurement period is counted, to a predetermined number of regions. The predetermined number of regions and the measurement period are programmable.

After every access (read or write) to the storage medium 106, the updating module 116 updates the number of accesses to the regions. At the end of a measurement period, the updating module 116 may generate a updated number of accesses to a region using the following formula (explained above):

$$T_{R(n)} \leftarrow \beta \times t_R + (1-\beta) \times T_{R(n-1)}$$

In the above equation, since T denotes temperature of a region, and since temperature of a region denotes mean-averaged number of block accesses per measurement interval, the terms of the above equation can be defined as follows.

$T_{R(n)}$ is a weighted mean-averaged number of accesses to a region R at time n. $T_{R(n-1)}$ is a weighted mean-averaged number of accesses to the region R at time (n−1). n is a number of intervals (n) elapsed since reboot or reset in increments of a measurement interval at which the updating module 116 updates the number of accesses to the region R. $\beta$ is a predetermined constant. $t_R$ is a last sample indicating the number of accesses to a region R during the last measurement interval.

$\beta$ is used to assign a weight to the last sample and to calculate weighted mean-averaged number of accesses to a region. The smaller the value of $\beta$, the higher the weight assigned to the access history of the region R while calculating the updated value of weighted mean-averaged number of accesses to a region. At the end of the measurement interval, the updated value is used to determine if the number of accesses to the region changed by a predetermined amount and if the region can be split or merged.

At the end of a measurement period, the count comparing module 118 uses the updated number of accesses to a region to determine the status of access to the region. Specifically, the count comparing module 118 determines whether the number of accesses per measurement period to the region increased or decreased by a predetermined amount. Optionally, the count comparing module 118 may also determine whether the number of accesses per measurement period to the region is above a predetermined range for two or more successive measurement periods.

Essentially, the count comparing module 118 determines whether the temperature of a region has increased or decreased by one or more grades. A grade is a range of number of accesses per measurement period to a region (see FIG. 1 for examples of grades). Optionally, the count comparing module 118 may determine whether the temperature of a region is above a particular grade (i.e., moderate) for two or more successive measurement periods.

Depending on the comparisons performed by the count comparing module 118, the region defining module 120 splits a region into two regions. Alternatively, the merging module 122 merges a region into an adjacent region or regions. The splitting performed by the region defining module 120 and the merging performed by the merging module 122 are described below in turn.

The splitting of one region into two regions and the merging of one region into another region are described below for example only. Alternatively or additionally, a region can be split into more than two regions, and more than two regions can be merged.

The region defining module 120 splits a region into two regions if the following criteria are met: (1a) The number of accesses per measurement period for the region has increased by a predetermined amount; OR (1b) The number of accesses per measurement period for the region is above a predetermined range for two or more successive measurement periods; AND (2) The total number of regions being monitored is less than or equal to a maximum number of regions; AND (3) the size of the region is greater than a predetermined minimum size.

The count comparing module 118 determines the criteria (1a) and (1b). The counting module 114 determines the criterion (2). The size comparing module 124 determines the criterion (3).

The operators OR and AND are logical operators. Thus, the region defining module 120 splits a region into two regions if a condition (((1a) OR (1B)) AND (2) AND (3)) is true for the region. Essentially, the region defining module 120 defines two regions within the region for which the above criteria are met.

In some implementations, the region defining module 120 may use different criteria to split a region. For example, the region defining module 120 may split a region into two regions if a condition ((1a) OR (1B)) is true for the region. That is, the region defining module 120 may split a region without using criterion (2) and/or criterion (3).

After the region defining module 120 splits a region into two regions, the counting module 114 determines the number of accesses to the two regions using the following formulas (explained above):

$$T_{R1(n)} = T_{R(n)}, N_{R1} = N_R \div 2,$$

and $$T_{R2(n)} = T_{R(n)}, N_{R2} = N_R \div 2$$

In the above equations, since T denotes temperature of a region, and since temperature of a region denotes mean-averaged number of block accesses per measurement interval, the terms of the above equations can be defined as follows.

$N_{R1}$ is the size of the first split region R1. $N_{R2}$ is the size of the second split region R2. $N_R$ is the size of the original region R. $T_{R1(n)}$ is the weighted mean-averaged number of accesses to the first split region R1 at time n. $T_{R2(n)}$ is the weighted mean-averaged number of accesses to the second split region R2 at time n. $T_{R(n)}$ is the weighted mean-averaged number of accesses to the original region R at time n.

Thereafter, during subsequent measurement periods, the count comparing module 118 performs the comparisons described above for each of the two regions, and so on. The process continues until the size comparing module 124 determines that the size of the region being monitored is less than or equal to the predetermined minimum size (i.e., the smallest size) for a region.

The caching module 126 caches the entire region being monitored into the cache memory 112 when the size of the region is less than or equal to predetermined minimum size. In some implementations, the caching module 126 may also store data from the area adjacent to the region in the cache memory 112. In some implementations, the caching module 126 may invoke aggressive pre-fetching around the area that was last accessed or alter the duration for which cached data from a particular region stays in the cache. After the region is cached, during subsequent read/write operations requiring access to the region, the read/write module 110 accesses the region stored in the cache memory 112 instead of accessing the storage medium 106.

The merging performed by the merging module 122 is now described. Instead of splitting a region, depending on the comparisons performed by the count comparing module 118, the merging module 122 may merge a region into an adjacent region or regions when the following criteria are met: (1) The number of accesses per measurement period for the region has decreased by the predetermined amount; AND (2) The adjacent region or regions are in the same temperature grade as the region being monitored after the temperature grade of the region being monitored has been updated, where AND is a logical operator.

The criterion (2) to merge a region being monitored into an adjacent region or regions may instead be as follows: (2') The region being monitored and the adjacent region or regions have a rate of access (i.e., the number of accesses per measurement period) within a predetermined range. The count comparing module 118 determines the criteria (1), (2), and/or (2'). The caching module 126 does not cache merged regions into the cache memory 112.

After merging, the counting module 114 may determine the number of accesses to the merged region using the following formula (explained above):

$$T_{MR(n)} = (T_{R1(n)} \times N_{R1} + T_{R2(n)} \times N_{R2}) \div (N_{R1} + N_{R2})$$

where MR is the merged region formed by merging regions R1 and R2. In the above equation, since T denotes temperature of a region, and since temperature of a region denotes mean-averaged number of block accesses per measurement interval, the terms of the above equation can be defined as follows.

$N_{R1}$ is the size of the first region R1. $N_{R2}$ is the size of the second region R2. $T_{R1(n)}$ is the weighted mean-averaged number of accesses to the first region R1 at time n. $T_{R2(n)}$ is the weighted mean-averaged number of accesses to the second region R2 at time n. $T_{MR(n)}$ is the weighted mean-averaged number of accesses to the merged region MR at time n.

Thereafter, the system 100 may merge the merged region with other regions having the same number of weighted mean-averaged number of accesses or the same number of accesses per measurement period as the merged region.

By splitting and merging regions as described above, the system 100 isolates regions that are hotspots and caches only the regions that are hotspots. By distinguishing regions that are hotspots from regions that are less accessed relative to the hotspots, the system 100 provides effective caching.

Specifically, by caching regions that are hotspots, the system 100 increases the number of cache hits. Additionally, by not caching regions that are less accessed relative to the hotspots, the system 100 provides effective caching.

Figure 4:
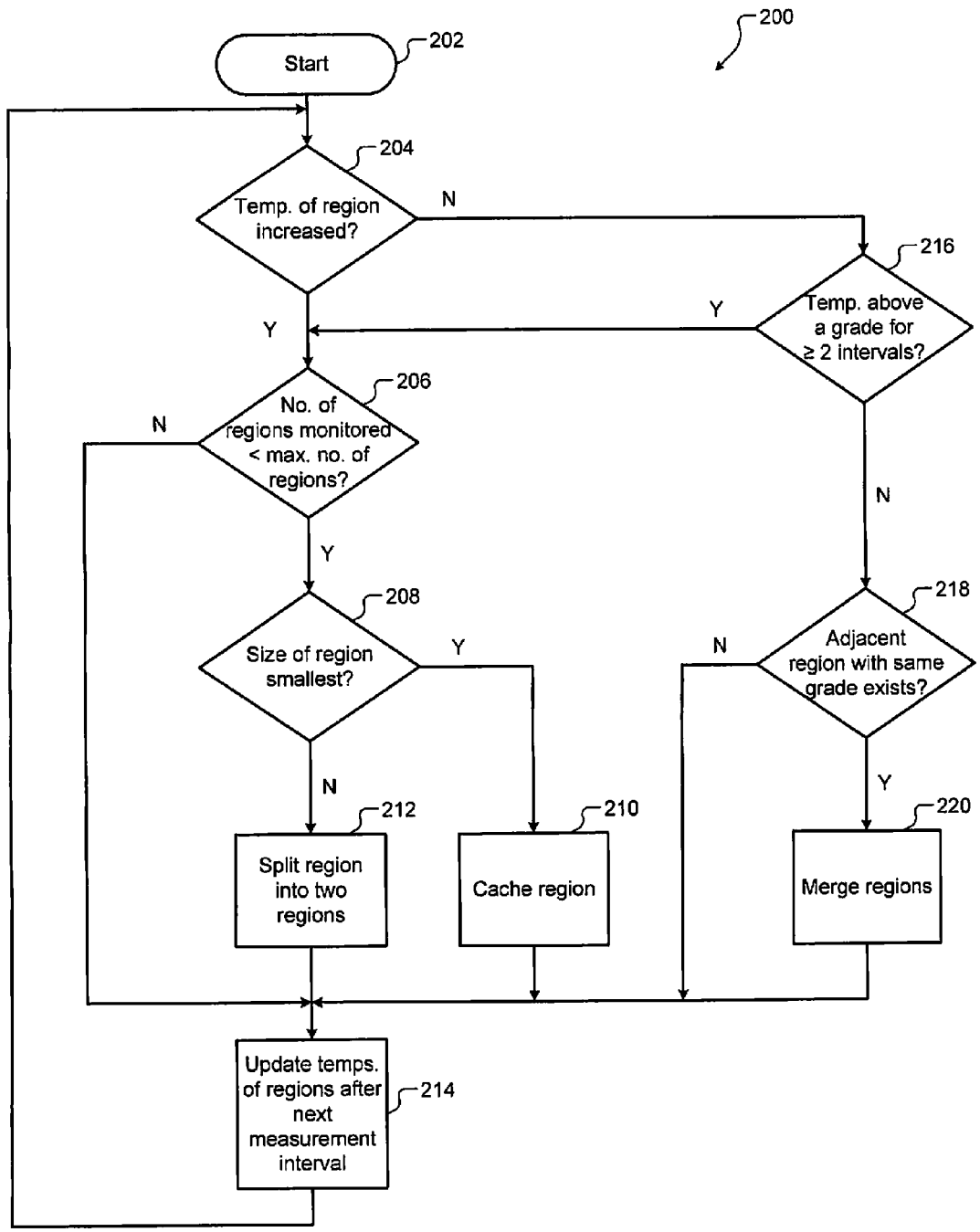
FIG. 4 is a flowchart of a method for identifying a hotspot of a storage device and caching data from the hotspot into a cache memory.

Referring now to FIG. 4, a method 200 for identifying a hotspot and caching data from the hotspot according to the present disclosure is shown. Control begins at 202. At 204, control determines if the temperature of a region increased by a predetermined amount at the end of a measurement interval.

If the temperature increased, control determines at 206 if the total number of regions being monitored is less than the maximum number of regions that can be monitored. If the total number of regions being monitored is less than the maximum number of regions, control determines at 208 if the size of the region being monitored is equal to the predetermined minimum size (i.e., the smallest size). If the size of the region being monitored is equal to the smallest size, control caches the data in the region (and data in the area surrounding the region) at 210.

If, however, the size of the region is greater than the smallest size, control splits the region into two regions at 212. At 214, after the next measurement interval, control updates the temperatures of the regions being monitored, and control returns to 204.

At 206, if the total number of regions being monitored is not less than the maximum number of regions that can be monitored, control proceeds to 214. Control also proceeds to 214 after 210. At 214, after the next measurement interval, control updates the temperatures of the regions being monitored, and control returns to 204.

At 204, if the temperature of the region being monitored did not increase, control determines at 216 if the temperature is above a predetermined grade for two or more measurement intervals. If the temperature is above a predetermined grade for two or more measurement intervals, control returns to 206.

If, however, control determines at 216 that the temperature decreased, then control determines at 218 if any adjacent region or regions having equal temperature as the region being monitored exists. At 220, control merges the region being monitored with a existing adjacent region or regions having equal temperature. If an adjacent region having equal temperature as the region being monitored does not exist, or after 220, control proceeds to 214.

Since the system 100 and method 200 cache data from hotspots, a cache miss may occur when the host requests data from a region that is colder than the hotspots. In other words, since the system 100 and method 200 do not cache regions colder than the hotspots, a cache miss may occur when the host requests data from a colder region. The increase in cache hits due to caching the hotspots, however, may outweigh performance loss due to a cache miss.

In some implementations, the system 100 and method 200 may monitor regions colder than the hotspots less frequently than the hotspots. The system 100 and the method 200 may cache data from a colder region depending on many factors. The factors may include the size of the cache memory 112, the size of the colder region, the number of cache misses corresponding the colder region, and so on.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
a counting module configured to
count a first number of accesses to a first region of a storage medium during a first time period, and
count a second number of accesses to the first region during a second time period following the first time period;
a region defining module configured to define a second region and a third region within the first region in response to the second number of accesses being greater than the first number of accesses by a predetermined amount,
wherein the counting module is further configured to count a third number of accesses to the second region during a third time period following the second time period, and
wherein the region defining module is further configured to define a fourth region and a fifth region within the second region in response to the third number of accesses to the second region being greater than a fourth number of accesses to the third region during the third time period; and
a caching module configured to cache the fourth region into a cache memory in response a size of the fourth region being less than or equal to a predetermined size.

2. The system of claim 1, further comprising a merging module configured to merge the fifth region into the third region, wherein the fifth region is adjacent to the third region, in response to:
a rate of access to the fifth region and the third region being within a predetermined range.

3. The system of claim 1, wherein the region defining module is further configured to define the second region and the third region within the first region when a size of the first region is greater than the predetermined size.

4. The system of claim 3, wherein the region defining module is further configured to define the second region and the third region within the first region when a total number of regions concurrently monitored by the counting module is less than or equal to a predetermined number of regions.

5. The system of claim 1, wherein the caching module is further configured to cache data from a sixth region of the storage medium into the cache memory, wherein the sixth region is adjacent to the fourth region.

6. The system of claim 1, further comprising an updating module configured to update the second number of accesses to the first region during the second time period based on the first number of accesses to the first region during the first time period.

7. A controller comprising:
the system of claim 1;
the cache memory; and
a read/write module configured to
read/write data from/to the storage medium, and
read data corresponding to the fourth region from the cache memory in response to the data being read after the fourth region is cached into the cache memory.

8. The system of claim 1, further comprising an updating module configured to update a number of accesses to a region R using equation $$T_{R(n)} \leftarrow \beta \times t_R + (1-\beta) \times T_{R(n-1)}$$

where
$T_{R(n)}$ is a weighted mean-averaged number of accesses to the region R at time n,
$T_{R(n-1)}$ is a weighted mean-averaged number of accesses to the region R at time (n−1),
n is a number of intervals (n) elapsed since reboot or reset in increments of a measurement interval at which the updating module updates the number of accesses to the region R,
$\beta$ is a predetermined constant, and
$t_R$ is a last sample indicating the number of accesses to the region R during a last measurement interval.

9. A system comprising:
a counting module configured to
count a first number of accesses to a first region of a storage medium during a first time period, and
count a second number of accesses to the first region during a second time period following the first time period;
a region defining module configured to selectively define a second region and a third region within the first region when the second number of accesses is greater than the first number of accesses by a predetermined amount; and
a caching module configured to selectively cache the second region into a cache memory when a third number of accesses to the second region during a third time period following the second time period is greater than a fourth number of accesses to the third region during the third time period,
wherein the region defining module is configured to define a region R1 and a region R2 within a region R based on a number of accesses to the region R, and
wherein the counting module is configured to count a number of accesses to the region R1 and a number of accesses to the region R2 using equations $$T_{R1(n)} = T_{R(n)}, N_{R1} = N_R \div 2,$$

and $$T_{R2(n)} = T_{R(n)}, N_{R2} = N_R \div 2$$

where
$N_{R1}$ is a size of the region R1,
$N_{R2}$ is a size of the region R2,
$N_R$ is a size of the region R,
$T_{R1(n)}$ is a weighted mean-averaged number of accesses to the region R1 at time n,
$T_{R2(n)}$ is a weighted mean-averaged number of accesses to the region R2 at time n, and
$T_{R(n)}$ is a weighted mean-averaged number of accesses to the region R at time n.

10. A system comprising:
a counting module configured to
count a first number of accesses to a first region of a storage medium during a first time period, and
count a second number of accesses to the first region during a second time period following the first time period;
a region defining module configured to selectively define a second region and a third region within the first region when the second number of accesses is greater than the first number of accesses by a predetermined amount;
a caching module configured to selectively cache the second region into a cache memory when a third number of accesses to the second region during a third time period following the second time period is greater than a fourth number of accesses to the third region during the third time period; and
a merging module configured to merge a region R1 and a region R2 into a region MR based on a number of accesses to the region R1 and a number of accesses to the region R2, wherein the counting module is configured to count a number of accesses to the region MR using equation $$T_{MR(n)}=(T_{R1(n)} \times N_{R1}+T_{R2(n)} \times N_{R2}) \div (N_{R1}+N_{R2})$$

where $N_{R1}$ is a size of the region R1, $N_{R2}$ is a size of the region R2, $T_{R1(n)}$ is a weighted mean-averaged number of accesses to the region R1 at time n, $T_{R2(n)}$ is a weighted mean-averaged number of accesses to the region R2 at time n, and $T_{MR(n)}$ is a weighted mean-averaged number of accesses to the region MR at time n.

11. A method comprising:
using a processor:
counting a first number of accesses to a first region of a storage medium during a first time period;
counting a second number of accesses to the first region during a second time period following the first time period;
defining a second region and a third region within the first region in response to the second number of accesses being greater than the first number of accesses by a predetermined amount;
counting a third number of accesses to the second region during a third time period following the second time period;
defining a fourth region and a fifth region within the second region in response to the third number of accesses to the second region being greater than a fourth number of accesses to the third region during the third time period; and
caching the fourth region into a cache memory in response to a size of the fourth region being less than or equal to a predetermined size.

12. The method of claim 11, further comprising merging the fifth region into the third region of the storage medium, wherein the fifth region is adjacent to the third region, in response to:
a rate of access to the fifth region and the third region being within a predetermined range.

13. The method of claim 11, further comprising defining the second region and the third region within the first region when a size of the first region is greater than the predetermined size.

14. The method of claim 13, further comprising defining the second region and the third region within the first region when a total number of regions concurrently monitored by the counting module is less than or equal to a predetermined number of regions.

15. The method of claim 11, further comprising caching data from a sixth region of the storage medium into the cache memory, wherein the sixth region is adjacent to the fourth region.

16. The method of claim 11, further comprising updating the second number of accesses to the first region during the second time period based on the first number of accesses to the first region during the first time period.

17. The method of claim 11, further comprising reading data corresponding to the fourth region from the cache memory in response to the data being read after the fourth region is cached into the cache memory.

18. The method of claim 11, further comprising updating a number of accesses to a region R using equation $$T_{R(n)} \leftarrow \beta \times t_R + (1-\beta) \times T_{R(n-1)}$$

where $T_{R(n)}$ is a weighted mean-averaged number of accesses to the region R at time n, $T_{R(n-1)}$ is a weighted mean-averaged number of accesses to the region R at time (n−1), n is a number of intervals (n) elapsed since reboot or reset in increments of a measurement interval at which the updating module updates the number of accesses to the region R, β is a predetermined constant, and $t_R$ is a last sample indicating the number of accesses to the region R during a last measurement interval.

19. The method of claim 11, further comprising:
defining a region R1 and a region R2 within a region R based on a number of accesses to the region R; and
counting a number of accesses to the region R1 and a number of accesses to the region R2 using equations $$T_{R1(n)}=T_{R(n)}, N_{R1}=N_R \div 2,$$

and $$T_{R2(n)}=T_{R(n)}, N_{R2}=N_R \div 2$$

where $N_{R1}$ is a size of the region R1, $N_{R2}$ is a size of the region R2, $N_R$ is a size of the region R, $T_{R1(n)}$ is a weighted mean-averaged number of accesses to the region R1 at time n, $T_{R2(n)}$ is a weighted mean-averaged number of accesses to the region R2 at time n, and $T_{R(n)}$ is a weighted mean-averaged number of accesses to the region R at time n.

20. The method of claim 11, further comprising:
merging a region R1 and a region R2 into a region MR based on a number of accesses to the region R1 and a number of accesses to the region R2; and
counting a number of accesses to the region MR using equation $$T_{MR(n)}=(T_{R1(n)} \times N_{R1}+T_{R2(n)} \times N_{R2}) \div (N_{R1}+N_{R2})$$

where $N_{R1}$ is a size of the region R1, $N_{R2}$ is a size of the region R2, $T_{R1(n)}$ is a weighted mean-averaged number of accesses to the region R1 at time n, $T_{R2(n)}$ is a weighted mean-averaged number of accesses to the region R2 at time n, and $T_{MR(n)}$ is a weighted mean-averaged number of accesses to the region MR at time n.

* * * * *